United States Patent [19]

Bellehache et al.

[11] 4,401,423

[45] Aug. 30, 1983

[54] APPARATUS FOR BLOW MOLDING HOLLOW PLASTIC BODIES

[75] Inventors: Pierre Bellehache, Sainte Adresse; Jean M. Houdan, Montivilliers, both of France

[73] Assignee: Societe de Machines pour la Transformation des Plastiques, Nancy, France

[21] Appl. No.: 358,779

[22] Filed: Mar. 17, 1982

[30] Foreign Application Priority Data

Mar. 20, 1981 [FR] France .................. 81 05598

[51] Int. Cl.³ .......................................... B29C 17/07
[52] U.S. Cl. ................................. 425/210; 264/525; 425/526; 425/536
[58] Field of Search ............... 425/210, 524, 526, 536; 264/525; 422/295, 300

[56] References Cited

U.S. PATENT DOCUMENTS 3,712,784  1/1973  Siard et al. .................. 264/525 X

FOREIGN PATENT DOCUMENTS 2415529  8/1979  France .

Primary Examiner—Jan H. Silbaugh
Attorney, Agent, or Firm—Sughrue, Mion, Zinn, Macpeak and Seas

[57] ABSTRACT

An electrically heated sterilization chamber 9 for a hollow blow molding needle 15 is embodied in a half-mold 1A and exits directly into the mold cavity 3, 4. A three-way distributor core 11 enables the selective connection of the sterilization chamber to the mold cavity or to a circuit 21 comprising a vacuum source 35 and a source of sterile water vapor 37 coupled in parallel. The needle is initially sterilized by the hot water vapor, and thereafter maintained in a sterile state by the electrical heating and its confinement within the half-mold.

3 Claims, 6 Drawing Figures

APPARATUS FOR BLOW MOLDING HOLLOW PLASTIC BODIES

BACKGROUND OF THE INVENTION

This invention relates to an apparatus for blow molding hollow plastic bodies of the type comprising an openable mold, a hollow needle which can be connected to a sterile gas supply source, a sterilization chamber, and means for moving the front portion of the needle between a sterilization position within the chamber and a blow position within the mold cavity. The invention is applicable in particular to the manufacture of internally sterile receptacles, such as bottles or flasks, intended to be filled with pharmaceutical or food products.

The nature and characteristics of certain products require that they be enclosed and preserved in perfectly sterile receptacles. For these products it it therefore necessary to provide internally sterile receptacles, and to fill and close such receptacles in a sterile manner. The manufacture of such sterile receptacles in plastic is generally carried out by extruding a tubular parison or rough blank at a temperature which ensures sterilization, and then blow molding the blank with sterile air introduced through a needle traversing the wall of the blank. In order to obtain such a sterile receptacle, it is necessary that the blow needle itself be both internally and externally sterile.

In known devices of this type the sterilization chamber for the blow needle is separated from the mold and provided with an opening to allow the needle to pass therethrough. Consequently, the end of the needle may be poorly sterilized. Moreover, during transfer from the sterilization chamber to the mold and vice-versa, the needle passes through a non-sterilized area which can destroy its initial sterilization. Furthermore, the blow cycle rate is limited by problems of positioning the needle in relation to the mold.

SUMMARY OF THE INVENTION

The object of the present invention is to overcome these disadvantages by providing a device which ensures that the needle, or at least its useful front portion, is permanently maintained in a sterile state, which enables an increase in the rate of production. To achieve this object, the sterilization chamber is embodied in a half-mold, and the needle moves within a passage which exits into a cavity of the mold which receives the blank.

In a preferred embodiment the needle may be connected at its rear to a sterile gas supply source or to the atmosphere, and one portion of the needle passage adjacent the mold cavity is composed of two aligned channels within a three-way distributor core which enables selective connection of the sterilization chamber to the mold cavity or to a source of water vapor. This allows an initial water vapor sterilization of the needle to be carried out without the condensate penetrating into the mold cavity.

DETAILED DESCRIPTION OF THE PREFERRED EMBODIMENT

Figure 1:
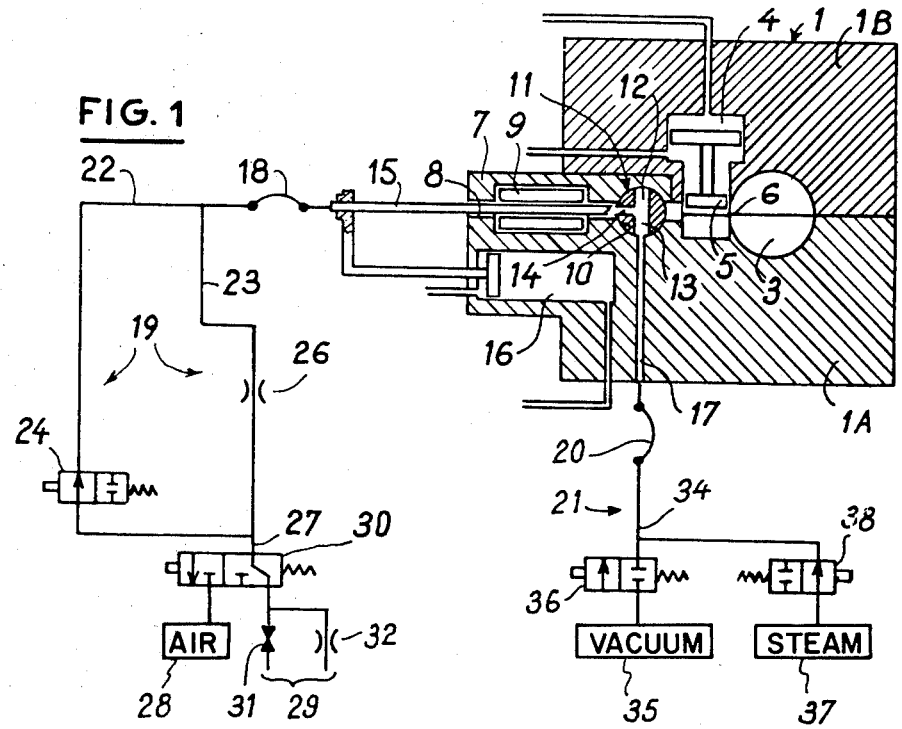
FIGS. 1 through 6 inclusive show schematic representations of a blow molding apparatus according to the invention during successive stages of operation.

The blow molding apparatus shown in the drawings comprises an openable mold 1 composed of two half-molds 1A and 1B. When closed the mold defines two cavities 3, 4 communicating with each other, cavity 3 being the molding cavity. It is provided with cooling means (not shown) and defines the external shape of the hollow body to be produced, which is for example a flask or bottle, whereas the other cavity 4 accomodates a jack whose piston 5 can pass in front of the opening 6 communicating the two cavities.

Half-mold 1A has a projection 7 through which a linear passage 8 is provided which exits into cavity 4 in the axis of the opening 6. An electrical resistance heating sheath 9 surrounds a large portion of passage 8 and, between this sheath and opening 6, the passage widens into a cylindrical cavity 10 in which a T-shaped three-way distributor core 11 is mounted. Two axially communicating passages or channels 12 and 13 extend diametrically through the distributor core, and are centrally intersected by a third perpendicular passage 14.

A hollow blow needle 15 slides within the passage 8 and its movement is controlled by a jack 16 housed in projection 7. The needle can pass through core passages 12 and 13 when they are aligned with the passage 8. In such position core passage 14 communicates with a passage 17 of half-mold 1A.

The needle is connected on the outside of the mold via a flexible tube 18, to a circuit 19 for sterile air supply or atmospheric venting. Passage 17 is similarly connected on the outside of the mold via a flexible tube 20, to a vapor or vacuum supply circuit 21.

Circuit 19 comprises two parallel lines 22 and 23. A two-position distributor 24 and a constrictor 26 are inserted into lines 22 and 23, respectively. The two lines are connected to a single line 27 which can be placed in communication with either a sterile air source 28 or with the atmosphere at 29 by means of a two-position distributor 30 having two inputs and four outputs. Connection with the atmosphere is implemented either by opening a valve 31 or by a constrictor 32 which is permanently open.

The vapor or vacuum supply circuit 21 comprises a forked line 34 connected to a vacuum source 35 by a two-position distributor 36, and to a water vapor supply source 37 by a two-position distributor 38. With the exception of distributor 30, the other distributors 24, 36 and 38 are such that in a rest position they interrupt the line in which they are placed, and in the operating position, that is in an energized or actuated state, they enable the passage of fluid through the line.

In the following text, the actual blowing operation per se will not be described in detail; this is well known and disclosed in French Pat. No. 2,415,529, for example.

At the time of start up the assembly is first sterilized by vapor from source 37 (FIG. 1). During this initial sterilization the needle 15 is withdrawn, piston 5 is retracted to free opening 6, and the distributor core 11 isolates the needle 15 from the cavities 3 and 4 of the mold and places line 17 in communication with the needle via core passages 13 and 14. Distributors 24 and 38 allow the passage of the vapor, whereas distributor 36 is closed. Distributor 30 connects line 27 to the atmosphere via constrictor 32, valve 31 being closed, so that the vapor circulates under pressure within circuit 21 and then circuit 19. The vapor heats needle 15 sufficiently to ensure its sterilization both internally and externally.

Figure 2:
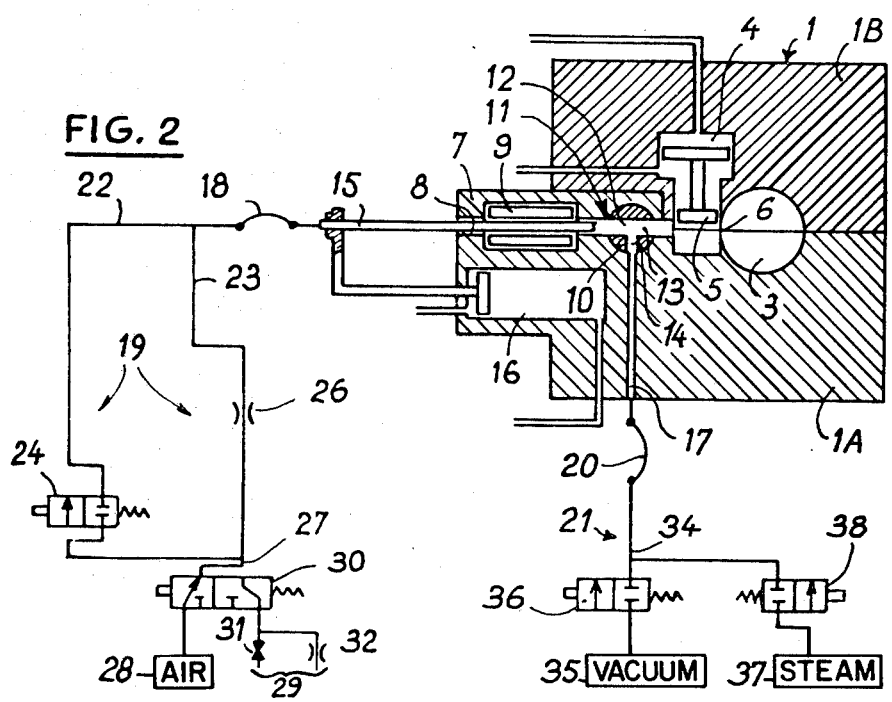

Distributor core 11 is next rotated to place needle 15 in communication with mold cavities 3 and 4 via core passages 12 and 13 (FIG. 2). Distributor 38 is closed to interrupt the vapor supply. The vapor remaining within circuit 19 is expelled by sterile air from source 28 by reversing the position of distributor 30, distributor 24 being open. Any residual vapor is simultaneously driven from the mold. After complete cooling the heating sheath 9 is energized to maintain the external sterility of the needle, and distributor 24 is closed (as shown). Thus, only low pressure sterile air passing through constrictor 26 continues to circulate within needle 15. This air fills passages 12 and 13 of core 11 so that atmospheric contaminants cannot enter the needle.

In order to produce a hollow plastic body or sterile receptacle, a tubular rough or blank is first extruded which is rendered aseptic by its extrusion at a high temperature, for example 160° C. to 180° C. This temperature ensures total internal and external asepsis of the blank.

Figure 3:
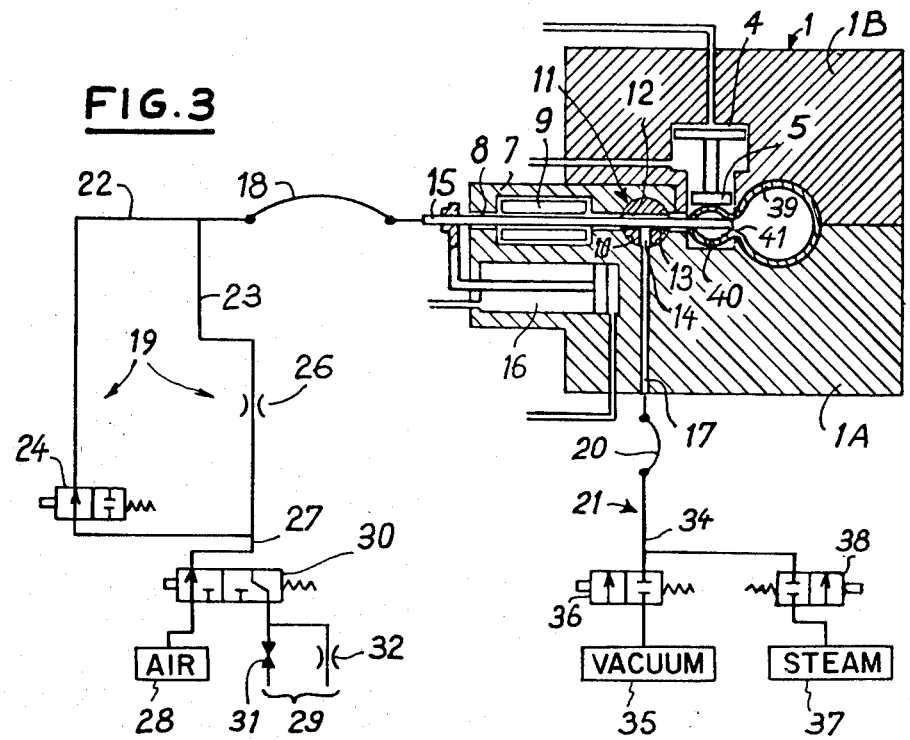

The blank is placed in the mold which, when closed, defines a parison element 39 contained in cavity 3 and a projection 40 contained in cavity 4 and communicating with element 39 by a neck 41 traversing the opening 6 (FIG. 3). Projection 40 does not completely fill cavity 4, but its temperature is sufficient to ensure the sterilization of the residual space surrounding it.

By activating jack 16, the needle 15 traverses distributor core 11, pierces projection 40 (as shown) and sealingly extends through neck 41 to penetrate into the parison element 39. Sterile air is then delivered at high pressure by opening distributor 24, whereby the parison element is blown and cools on contact with the wall of cavity 3, contrary to projection 40 which remains at a high temperature and soft.

Figure 4:
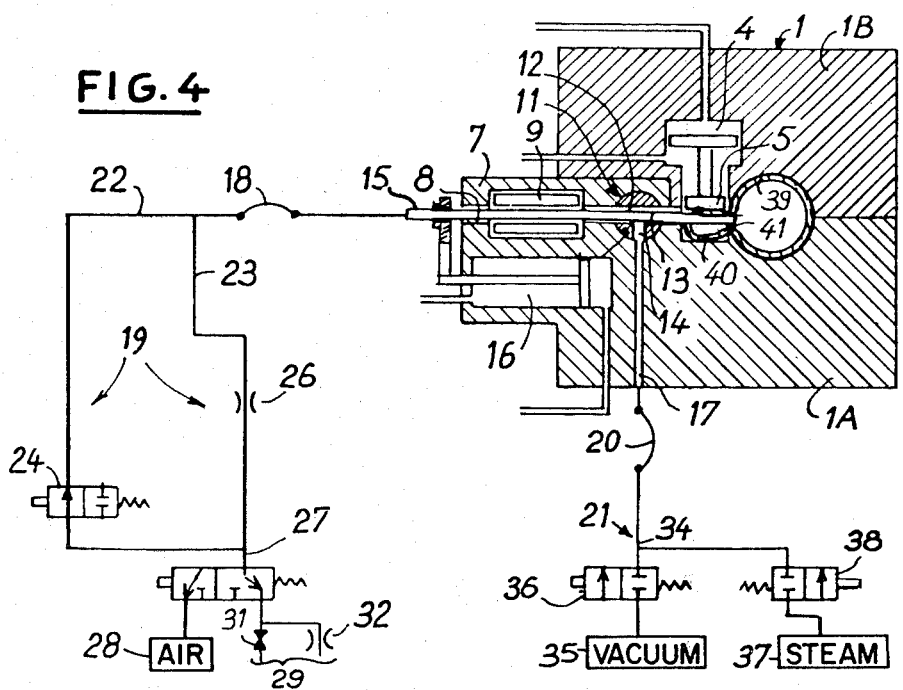
Figure 5:
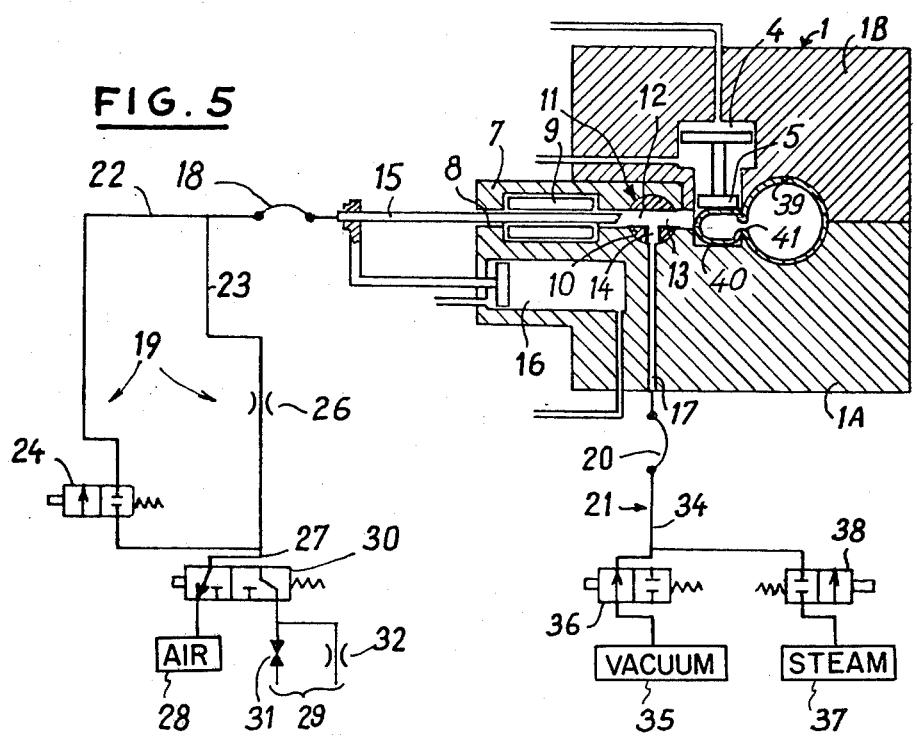

After blowing the receptacle, the supply of high pressure sterile air is interrupted by switching distributor 30. The pressurized sterile blowing air in the receptacle is then evacuated through distributor 24 and valve 31. After evacuation distributor 24 is closed (FIG. 4), the needle is withdrawn from the mold cavity by jack 16, distributor 30 is reversed and distributor 36 is opened. The coupling of the vacuum source 35 ensures complete evacuation (FIG. 5).

Figure 6:
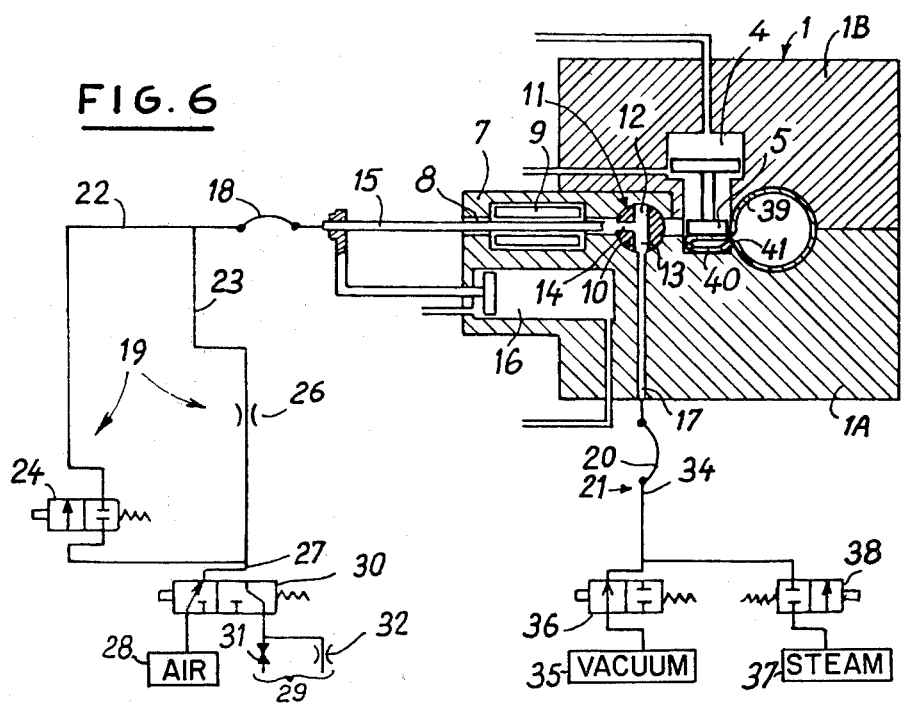

The distributor core 11 is next turned to isolate the needle 15 from the mold cavities 3 and 4, and the receptacle is closed by crushing projection 40 in the cavity 4 which is still soft, by means of piston 5 (FIG. 6). Sterile air is again continually sent at low pressure through needle 15, and this air is aspirated by the vacuum source 35 (distributor 24 closed).

Piston 5 is then retracted, mold 1 is opened, the closed sterile receptacle obtained is ejected, distributor core 11 is brought back to its preceding position and distributor 36 is closed, which brings the device back to the state shown in FIG. 2.

The manufacture of a new receptacle can then be carried out in the same manner as described above without repeating the initial vapor sterilization.

During the entire manufacturing cycle, the exterior of the needle is continuously sterilized by the heating sheath 9 since the needle slides inside the sheath and does not leave the mold.

After its vapor sterilization the blowing circuit, and in particular the needle which is a part thereof, cannot be contaminated by the outside atmosphere. In effect, the needle constantly remains within half-mold 1A, is only in contact with the sterile air, and is heated externally and continuously by the sheath 9. Moreover, distributor core 11 provides additional protection against the contamination of the needle by air contained in the mold cavity when the mold is opened to allow the introduction of blanks and the removal of blown receptacles.

It is clear that the invention can easily be adapted to a multiple mold machine, for example of the rotating turret type, by the incorporation of additional distributors and turning joints. In this case each mold would be fitted with a needle and a distributor core as shown, and elements 27 to 32 and 35 to 38 would be common to all of the molds and successively connected to them.

What is claimed is:

1. A blow molding apparatus for manufacturing hollow plastic bodies, comprising: an openable mold (1), a hollow blow needle (15), a sterilization chamber (9) defined within a half (1A) of said mold, means (16) for moving the needle between a sterilization position in which a front portion thereof is disposed within the chamber and a blowing position in which said front portion is introduced into a cavity (3) of said mold, the needle being slidably disposed within a passage (8) which exits into a further cavity (4) of the mold, means for selectively connecting a rear portion of the needle to a sterile gas supply source (28) or to the atmosphere (29), and a portion of said passage adjacent the further cavity comprising two aligned channels (12, 13) within a three-way distributor core (11) providing selective connection of the sterilization chamber (9) to the mold cavity or to a source of water vapor (37).

2. The apparatus of claim 1, further comprising a vacuum source (35) connected in parallel with the source of water vapor (37).

3. The apparatus of claims 1 or 2, wherein the means for selective connection to the atmosphere comprises a constrictor (32) and a stop valve (31) mounted in parallel.

* * * * *